Patented Feb. 19, 1924.

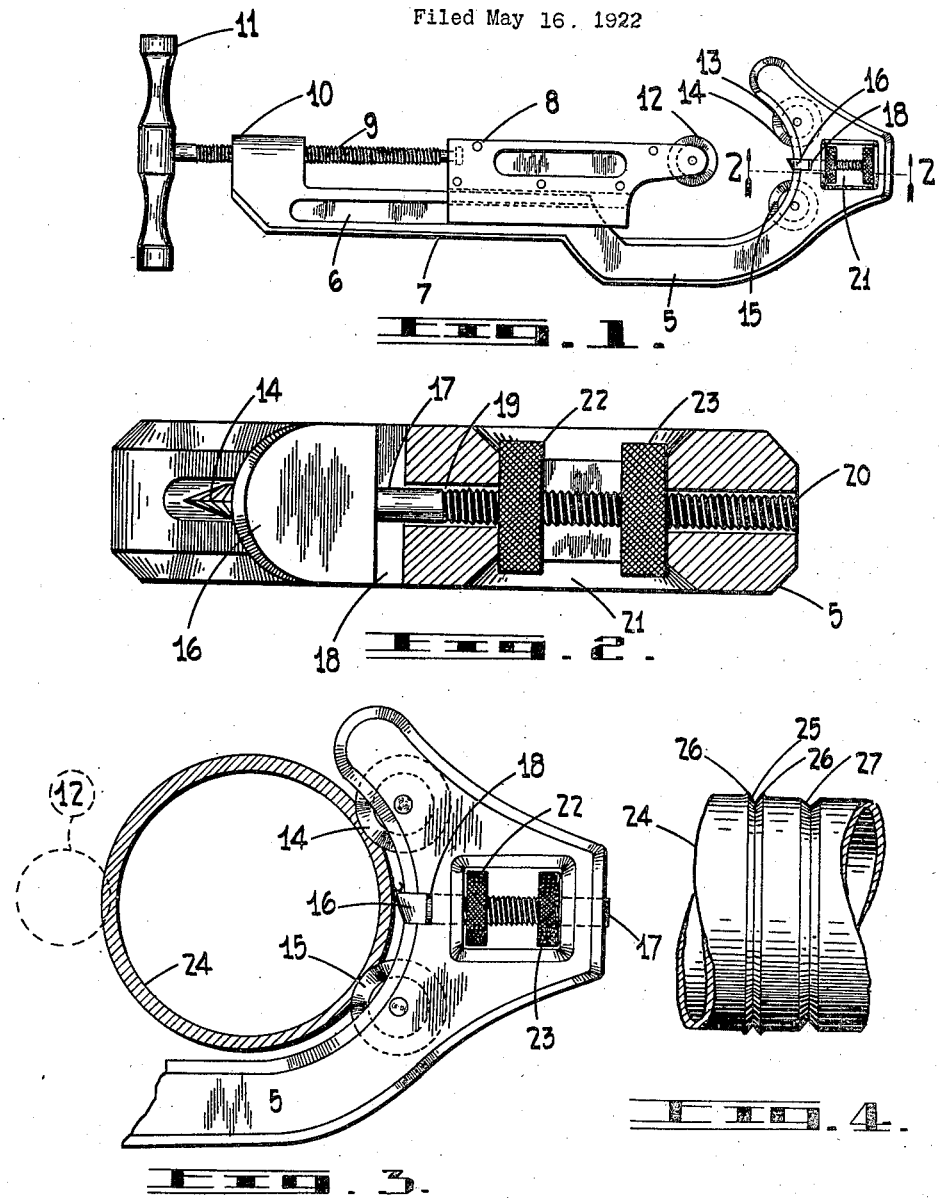

1,484,023

UNITED STATES PATENT OFFICE.

WILLIS HAYTER, OF CARBONEAR, NEWFOUNDLAND, ASSIGNOR OF ONE-HALF TO ALBERT EDWARD PENNEY, OF CARBONEAR, NEWFOUNDLAND.

PIPE CUTTER.

Application filed May 16, 1922. Serial No. 561,492.

*To all whom it may concern:*

Be it known that I, WILLIS HAYTER, a subject of the King of Great Britain, residing at Carbonear, in the Island of Newfoundland, have invented certain new and useful Improvements in Pipe Cutters, of which the following is a specification.

The present invention relates to new and useful improvements in pipe threading tools. In pipe threading tools of conventional construction, there is a certain inadequacy of design which has militated against the useful effects of the tool in that during the cutting operation, the burr formed on the pipe is not removed, resultant that after the pipe is cut, the burr formed must be removed by means of a file or like tool.

It is within the province of the disclosure to provide appurtenant burr removing elements to overcome the stated inadequacy.

An important feature of my invention resides in the fact that the burr removing element may be adjusted to comply with variations in the sizes of pipe cut.

The nature and advantages of my invention will be more readily understood after a perusal of the following description, the descriptive matter being supplemented by the accompanying schematic illustrations, wherein:

Figure 1 is a side elevation of a pipe cutting tool illustrating the embodiment of my present invention.

Figure 2 is an enlarged sectional detail as it would appear when taken on line 2—2 of Figure 1 in the direction of the indicating arrows.

Figure 3 is a fragmentary side elevation showing the application of the burr removing element with a pipe and Figure 4 is a fragmentary detail showing a portion of a pipe and the relative grooves cut therein with a cutting tool of conventional construction and a cutting tool incorporating my present invention.

Referring to the drawings in detail, wherein like numerals of reference designate corresponding parts throughout the several drawings, the numeral 5 designates a casting constituting the body of the tool. The said casting is provided with dual longitudinal grooves 6 in the shank 7 thereof for reception of the slidable cutter head 8 which is advanced by the threaded spindle 9 passing through a tapped aperture in the boss 10 formed on one extremity thereof. The numeral 11 designates a handle to facilitate turning the threaded spindle 9. The cutter head 8 is provided with the usual circular cutter 12.

The opposite extremity of the casting 5 is configurated for reception of the cutting and burring tool mechanism. An arcuate face 13 is formed in the casting 5 to comply with the circular formation of the pipes to be cut. Cutters 14 and 15 of the usual type are mounted in the said casting 5 and have disposed intermediate the same, the burring tool mechanism which constitutes the burring head 16 mounted on the inner terminal of the threaded spindle 17. The said head slides in the recess 18 formed in the arcuate face 13 of the casting 5. The said threaded spindle 17 passes through horizontally aligned apertures 19 and 20 formed in the casting 5. An opening designated by the numeral 21 is formed in the said casting, wherein are disposed the adjusting wheels 22 and 23, the circumferential peripheries of which are knurled to facilitate turning.

In operation, the pipe to be cut is disposed intermediate the cutters 12, 14 and 15, clearly shown in Figures 1 and 3. It is obvious that to perform the cutting operation, when the cutters 12, 14 and 15 coincide with the surface of the pipe, the tool is circumrotated thereabout, the pressure of the cutters being gradually increased by advancing the cutter head 8 through the medium of the threaded spindle 9 and the handle 11 previously described. The burring tool is adjusted to coincide with the circumferential surface of the pipe by turning the wheels 22 and 23 to permit adjustment of the spindle 17 after which the same is locked in position by further adjustment of the wheel 23.

It is obvious that during the entire cutting operation, the burr is removed as the annular surface of the pipe being actuated on is the same in relation to the cutting edge of the burring tool 16.

In Figure 4, I have shown the relation of grooves cut by cutting tools of conventional construction and by a cutting tool incorporating my present invention. In Figure 4, the pipe actuated on is denoted by the numeral 24. The numeral 25 denotes a groove cut by a burring tool of ordinary conventional construction. It is obvious that when a pipe is cut in the manner shown, the burr or upset peripheries as denoted by the numerals 26 must be removed by a file. The numeral 27 illustrates a groove cut with a cutting tool incorporating my present invention. It is obvious that the burr is entirely removed, thus obviating the necessity of filing the pipe after the cutting operation.

Since probably the best results may be obtained from my invention as disclosed, the same may well be followed, but within the scope of the appended claims, minor changes may well be made.

What I claim as new is:

1. In combination with a pipe cutting tool, burring mechanism adapted for removing the burr caused by the cutters of the said cutting tool during the cutting operation; said burring mechanism constituting a burring head disposed intermediate the cutters of the said cutting tool and means movably mounted on the shank of said head whereby the said burring head may be adjusted to compensate for variations in the nominal sizes of pipe, said adjusting means being disposed within the confines of the support of the burring head.

2. In combination with a pipe cutting tool, burring mechanism adapted for removing the burr caused by the cutters of the said cutting tool during the cutting operation; said burring mechanism constituting a burring head disposed intermediate the cutters of the said cutting tool; means movably mounted on the shank of said head whereby the said burring head may be adjusted to compensate for variations in the nominal sizes of pipe and means movably mounted on the shank of said head whereby the said burring head may be locked in adjusted position, both of said adjusting means being disposed within the confines of the support of the burring head.

In testimony whereof, I affix my signature in the presence of two witnesses.

WILLIS HAYTER.

Witnesses:
EDWARD L. OKE,
ALBERT E. PENNEY.